US012147121B2

(12) United States Patent
Chiu et al.

(10) Patent No.: US 12,147,121 B2
(45) Date of Patent: Nov. 19, 2024

(54) BACKLIGHT MODULE AND DISPLAY APPARATUS

(71) Applicants: Nano Precision (SuZhou) CO., LTD., Jiangsu (CN); Coretronic Corporation, Hsin-Chu (TW)

(72) Inventors: Wen-Yen Chiu, Hsinchu County (TW); Chao-Hung Weng, Hsinchu County (TW); Ming-Dah Liu, Hsinchu County (TW); Hsin-Wei Chen, Hsinchu County (TW); Yue-Feng Yang, Suzhou (CN)

(73) Assignees: Nano Precision (SuZhou) CO., LTD., Jiangsu (CN); Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/974,562

(22) Filed: Oct. 27, 2022

(65) Prior Publication Data
US 2023/0133614 A1 May 4, 2023

(30) Foreign Application Priority Data
Oct. 29, 2021 (CN) .......................... 202122625729.6

(51) Int. Cl.
*G02F 1/1335* (2006.01)
*G02F 1/13357* (2006.01)

(52) U.S. Cl.
CPC .. *G02F 1/133614* (2021.01); *G02F 1/133606* (2013.01)

(58) Field of Classification Search
CPC ..... G02B 6/0053; G02B 6/0043; G02B 6/005
See application file for complete search history.

(56) References Cited

U.S. PATENT DOCUMENTS

| | | | | |
|---|---|---|---|---|
| 10,649,114 | B2* | 5/2020 | Lee | G02B 6/0031 |
| 10,802,200 | B2* | 10/2020 | Kim | G02B 5/283 |
| 11,198,270 | B2* | 12/2021 | Dubrow | B32B 27/283 |
| 11,513,392 | B1* | 11/2022 | Luo | G02F 1/133605 |
| 2013/0308337 | A1* | 11/2013 | Chang | G02B 5/0231 362/606 |
| 2018/0039012 | A1* | 2/2018 | Shin | G02B 6/0056 |
| 2021/0311242 | A1* | 10/2021 | Yagi | G02F 1/133524 |

FOREIGN PATENT DOCUMENTS

| | | |
|---|---|---|
| TW | I472844 | 2/2015 |
| TW | I594054 | 8/2017 |
| TW | I697718 | 7/2020 |
| TW | M611892 | 5/2021 |

* cited by examiner

*Primary Examiner* — Eric T Eide
(74) *Attorney, Agent, or Firm* — JCIPRNET

(57) ABSTRACT

A backlight module includes a light-emitting element, a quantum dot film, an optical film and a light adjusting element. The light-emitting element is adapted to emit a blue light. The quantum dot film is adapted to converting a first portion and a second portion of the blue light into a red light and a green light, respectively. The optical film is disposed on the quantum dot film. The light adjusting element is disposed between the optical film and the quantum dot film. The light adjusting element has a first surface and a second surface respectively facing the quantum dot film and the optical film. The first surface has multiple first optical microstructures. The first optical microstructures include multiple cones protruding toward the quantum dot film. Moreover, a display apparatus including the backlight module is also provided.

17 Claims, 17 Drawing Sheets

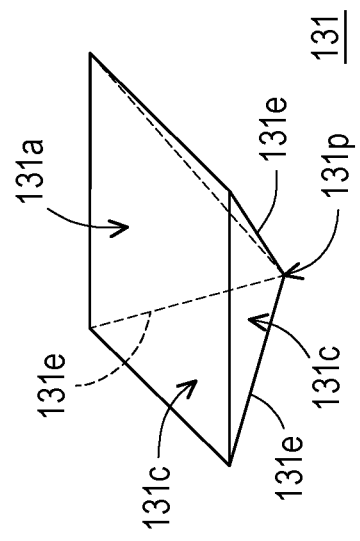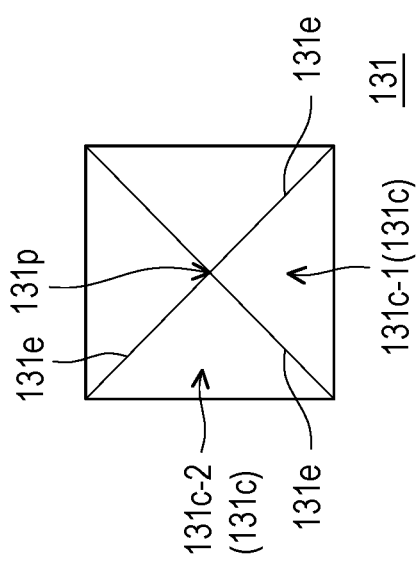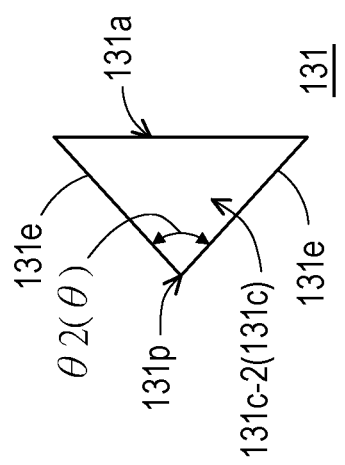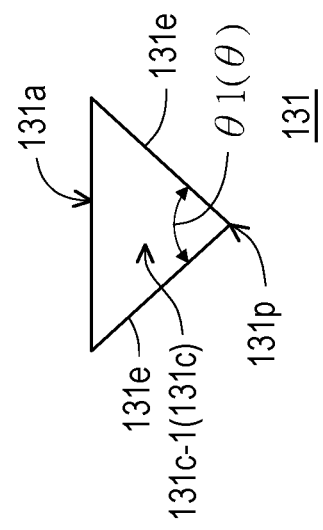
FIG. 3A
FIG. 3B
FIG. 3C
FIG. 3D

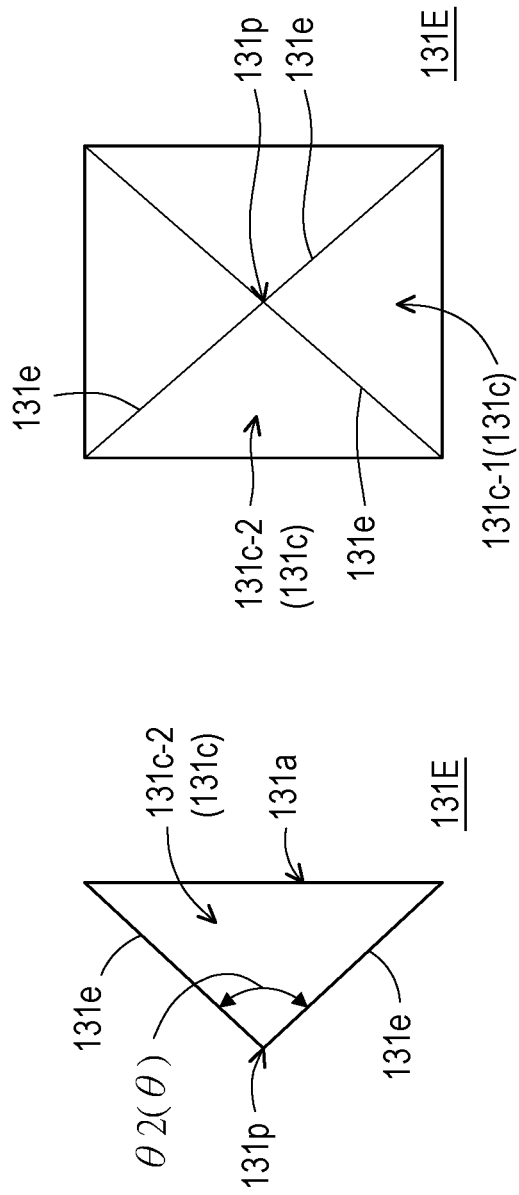
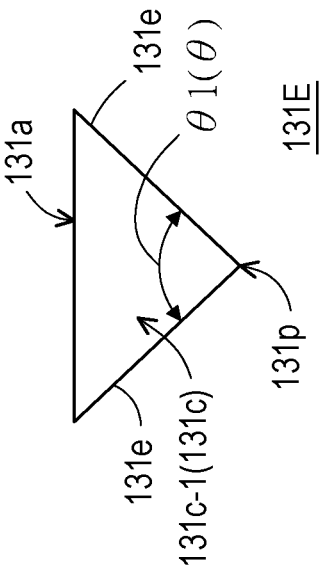
FIG. 16A
FIG. 16B
FIG. 16C

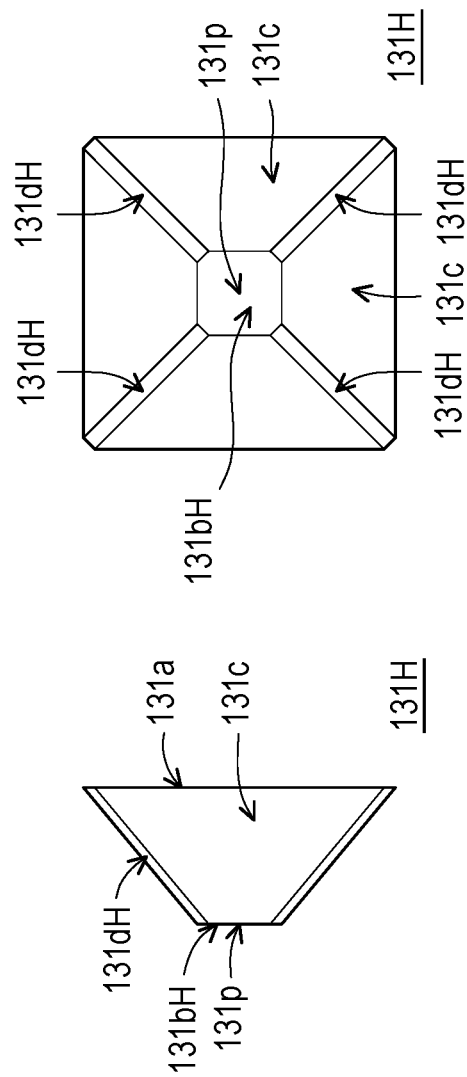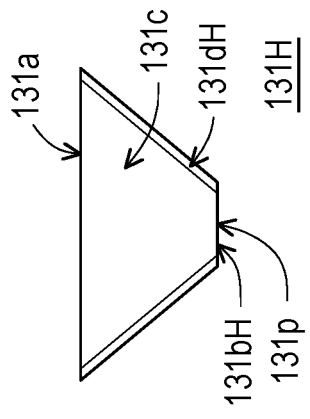
FIG. 19A
FIG. 19B
FIG. 19C

BACKLIGHT MODULE AND DISPLAY APPARATUS

CROSS-REFERENCE TO RELATED APPLICATION

This application claims the priority benefit of China application serial no. 202122625729.6 filed on Oct. 29, 2021. The entirety of the above-mentioned patent application is hereby incorporated by reference herein and made a part of this specification.

BACKGROUND

Technical Field

This disclosure relates to an optical module and an optical apparatus, and particularly relates to a backlight module and a display apparatus.

Description of Related Art

The current blue backlight module generally includes a blue light-emitting element, a quantum dot film arranged on the blue light-emitting element, and multiple prims sheets arranged on the quantum dot film. The blue light-emitting element is utilized to emit the blue band of visible light. After the conversion of the quantum dot film, part of the blue band is converted into other bands of visible light, thereby producing white light perceived by the human eye. Generally speaking, the white light field on the quantum dot film is of the Lambertian type, and it is necessary to use multiple prism sheets to converge the white light field of the Lambertian type to enhance the brightness of emergent light from the backlight module. However, there are still some white lights with large divergence angles that cannot be condensed by multiple prism sheets, and therefore the brightness of emergent light from the backlight module cannot be further enhanced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a backlight module that provides s good performance in brightness of emergent light.

The disclosure provides a display apparatus, which provides a good performance in brightness of emitted light.

Other purposes and advantages of the disclosure can be further understood from the technical features disclosed in the disclosure.

In order to achieve one or part or all of the above purposes or other purposes, the backlight module of an embodiment of the disclosure includes a light-emitting element, a quantum dot film, at least one optical film and a light adjusting element. The light-emitting element is adapted to emit a blue light. The quantum dot film is arranged on a transmitting path of the blue light, and adapted to convert a first portion and a second portion of the blue light into a red light and a green light, respectively. The at least one optical film is disposed on the quantum dot film. The light adjusting element is disposed between the at least one optical film and the quantum dot film. The light adjusting element has a first surface and a second surface respectively facing the quantum dot film and the at least one optical film. The first surface has multiple first optical microstructures. The multiple first optical microstructures include multiple cones protruding toward the quantum dot film.

In order to achieve one or part or all of the purposes or other purposes, the display apparatus of an embodiment of the disclosure includes the backlight module and a display panel disposed on the backlight module.

In an embodiment of the disclosure, the bottom surface of each of the multiple cones is polygonal.

In an embodiment of the disclosure, the bottom surface of each of the multiple cones is rounded.

In an embodiment of the disclosure, the multiple cones include multiple pyramid-like cones. Each of the multiple pyramid-like cones has a bottom surface, a top surface, and multiple side surfaces, and the bottom surface and the top surface are arranged opposite to each other. The vertex of each of the pyramid-like cones is located on the top surface, and multiple side surfaces are arranged between the bottom surface and the top surface.

In an embodiment of the disclosure, the top surface is a flat surface or a convex surface.

In an embodiment of the disclosure, each of the multiple pyramid-like cones further has multiple junction surfaces, and each of the multiple junction surfaces is disposed between the multiple side surfaces and between the bottom surface and the top surface.

In an embodiment of the disclosure, the junction surface is a flat surface or a convex surface.

In an embodiment of the disclosure, each of the multiple cones has a bottom surface, multiple side surfaces, and a vertex. The bottom surface and the vertex are disposed opposite to each other. The multiple side surfaces are disposed between the bottom surface and the vertex, and each of the multiple side surfaces include a first side surface and the second side surface, the first side surface and the second side surface adjacent to each other. Both sides of the first side surface connected to the vertex form a first angle, and both sides of the second side surface connected to the vertex form a second angle, and the angle of the first angle is different from the angle of the second angle.

In an embodiment of the disclosure, each of the multiple cones has a bottom surface, multiple side surfaces, and a vertex. The bottom surface and the vertex are disposed opposite to each other. The multiple side surfaces are disposed between the bottom surface and the vertex. Both sides of each of the multiple side surfaces connected to the vertex form an angle, and a range of the angle from 5° to 175°.

In an embodiment of the disclosure, the second surface of the light adjusting element has multiple second optical microstructures, and the shape of each of the multiple first optical microstructures is different from the shape of each of the multiple second optical microstructures.

In an embodiment of the disclosure, the multiple second optical microstructures include multiple convex lenses protruding toward the at least one optical film.

In an embodiment of the disclosure, the multiple vertical projections of the multiple convex lenses on the quantum dot film are multiple circles.

In an embodiment of the disclosure, the multiple vertical projections of the multiple convex lenses on the quantum dot film are multiple ovals.

In an embodiment of the disclosure, the multiple second optical microstructures include multiple columns. The multiple columns extend in a first direction. The multiple cones are arranged in an array in the first direction and the second direction, and the first direction is intersected with the second direction.

In an embodiment of the disclosure, the cross section of each of the multiple columns perpendicular to the first direction is a triangle.

In an embodiment of the disclosure, the cross section of each of the multiple columns perpendicular to the first direction is a part of a circle.

In an embodiment of the disclosure, the at least one optical film includes a first prism sheet, a second prism sheet, and a diffuser. The light adjusting element is disposed between the first prism sheet and the quantum dot film, and the first prism sheet has multiple first prism columns extending in the third direction. The first prism sheet is arranged between the second prism sheet and the light adjusting element. The second prism sheet has multiple second prism columns extending in the fourth direction, and the third direction is intersected with the fourth direction. The second prism sheet is disposed between the diffuser and the first prism sheet.

Based on the above, part of the white light with a large divergence angle from the quantum dot film can be guided to the positive direction through the multiple cones of the first surface of the light adjusting element. In this way, the white light from the quantum dot film can be fully utilized to achieve the effect of improving the brightness of emergent light from the backlight module.

In order to make the above-mentioned features and advantages of the disclosure more comprehensible, the following embodiments are provided, and the accompanying drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 3A is a three-dimensional schematic view of a cone according to the first embodiment of the disclosure.

FIG. 3B is a schematic front view of a cone according to the first embodiment of the disclosure.

FIG. 3C is a schematic side view of a cone according to the first embodiment of the disclosure.

FIG. 3D is a schematic bottom view of a cone according to the first embodiment of the disclosure.

FIG. 16A is a schematic bottom view of a cone according to the eleventh embodiment of the disclosure.

FIG. 16B is a schematic front view of a cone according to the eleventh embodiment of the disclosure.

FIG. 16C is a schematic side view of a cone according to the eleventh embodiment of the disclosure.

FIG. 19A is a schematic bottom view of a cone according to the fourteenth embodiment of the disclosure.

FIG. 19B is a schematic front view of a cone according to the fourteenth embodiment of the disclosure.

FIG. 19C is a schematic side view of a cone according to the fourteenth embodiment of the disclosure.

DESCRIPTION OF THE EMBODIMENTS

Figure 1:
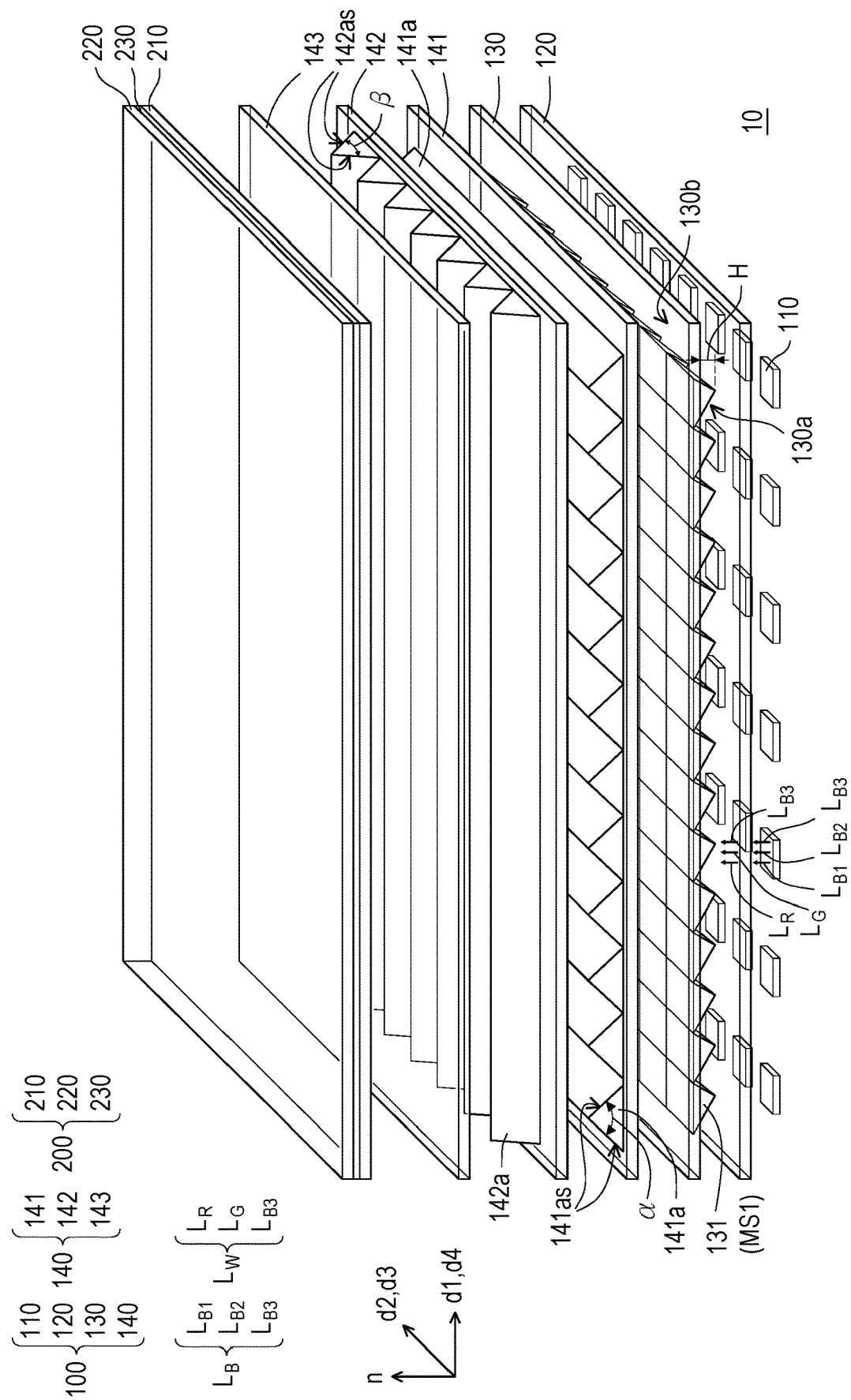
FIG. 1 is a three-dimensional schematic view of a display apparatus according to the first embodiment of the disclosure.

The foregoing and other technical content, features and effects of this disclosure will be clearly presented in the following detailed description of the preferred embodiment with reference to the drawings. In this regard, directional terminology, such as "top," "bottom," "left," "right," "front," "back," etc., is used only with reference to the orientation of the Figure(s) being described. As such, the directional terminology is used for purposes of illustration and is in no way limiting.

Reference will now be made in detail to the exemplary embodiments of the disclosure, and examples of the exemplary embodiments are illustrated in the accompanying drawings. Whenever possible, the same component symbols are used in the drawings and descriptions to indicate the same or similar parts.

FIG. 1 is a three-dimensional schematic view of a display apparatus according to the first embodiment of the disclosure. Please refer to FIG. 1, the display apparatus 10 includes a backlight module 100 and a display panel 200. The display panel 200 is disposed on the backlight module 100. The display panel 200 may include, for example, a pixel array substrate 210, an opposite substrate 220, and a non-self-luminous display medium 230. The pixel array substrate 210 and the counter substrate 220 are disposed opposite to each other, and the non-self-luminous display medium 230 is disposed between the pixel array substrate 210 and the opposite substrate 220. For example, in this embodiment, the non-self-luminous display medium 230 may be liquid crystal, but the disclosure is not limited thereto.

The backlight module 100 includes a light-emitting element 110, which is adaptable for emitting a blue light $L_B$. For example, in this embodiment, the light-emitting element 110 is a mini-LED; however, the disclosure is not limited thereto. In other embodiments, the light-emitting element 110 may also be of other sizes and/or types.

The backlight module 100 further includes a quantum dot film 120 disposed on the transmitting path of the blue light $L_B$, and is adaptable for converting the first portion $L_{B1}$ and the second portion $L_{B2}$ of the blue light $L_B$ into a red light $L_R$ and a green light $L_G$, respectively. The quantum dot film 120 is disposed on a transmitting path of third portion $L_{B3}$ of the blue light $L_B$, but the third portion $L_{B3}$ is not converted by the quantum dot film 120. The red light $L_R$ converted from the first portion $L_{B1}$ of the blue light $L_B$, the green light $L_G$ converted from the second portion $L_{B2}$ of the blue light $L_B$ and the third portion $L_{B3}$ which is not converted from the blue light $L_B$ are mixed to form a white light Lw.

The backlight module 100 further includes a light adjusting element 130, which is disposed between at least one optical film 140 and the quantum dot film 120. The light adjusting element 130 has a first surface 130a and a second surface 130b facing the quantum dot film 120 and the at least one optical film 140, respectively.

Figure 2:
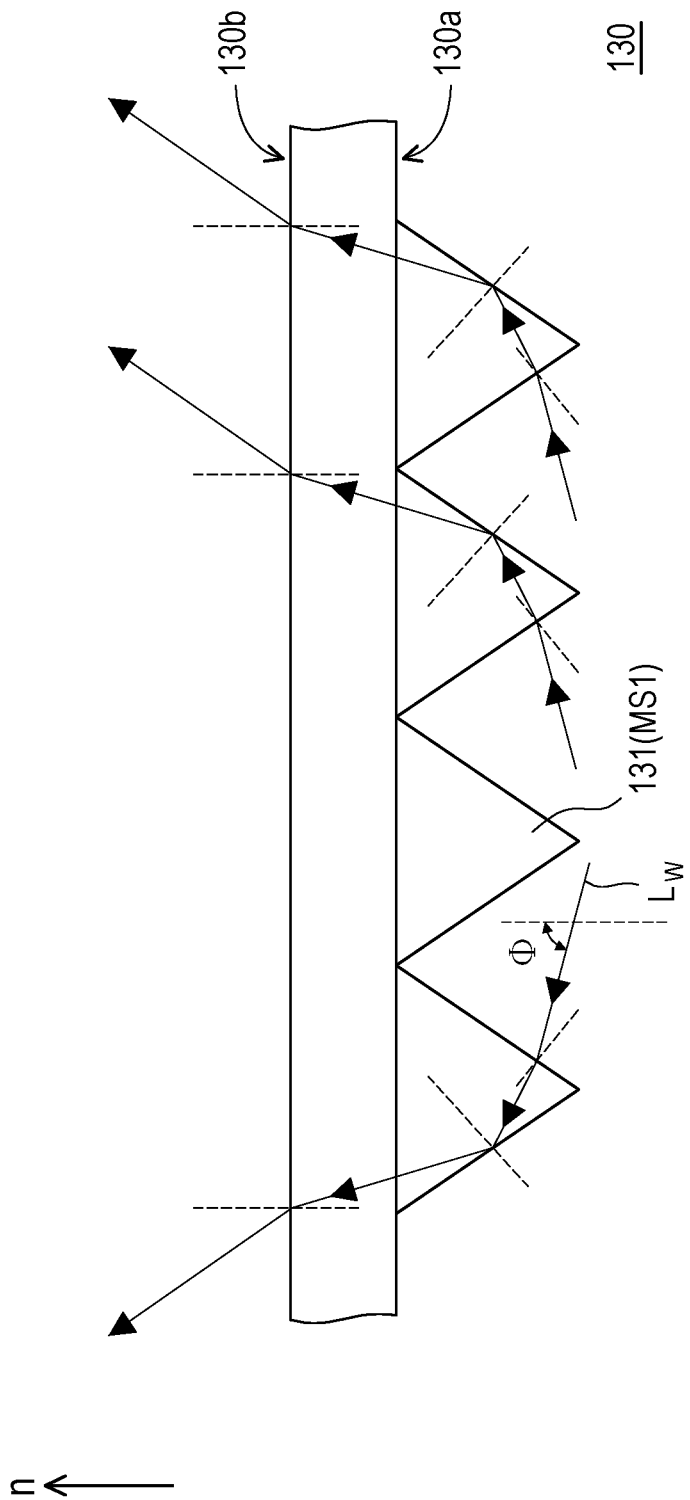
FIG. 2 is a schematic cross-sectional view of a light adjusting element according to the first embodiment of the disclosure.

FIG. 2 is a schematic cross-sectional view of a light adjusting element according to the first embodiment of the disclosure. Referring to FIG. 1 and FIG. 2, it should be noted that the first surface 130a of the light adjusting element 130 has multiple first optical microstructures MS1, and the multiple first optical microstructures MS1 include multiple cones 131 protruding toward the quantum dot film 120. In this embodiment, the multiple cones 131 may be arranged in an array in the first direction d1 and the second direction d2, and the first direction d1 and the second direction d2 are intersected.

It should be mentioned that the light field of the white light Lw from the quantum dot film 120 is a Lambertian type. That is, part of the white light Lw from the quantum dot film 120 has a large divergence angle φ. Through the refraction and reflection of the cone 131, part of the white light Lw with a large divergence angle φ can be guided to the positive direction n. In this way, the white light Lw from the quantum dot film 120 can be fully utilized to achieve the effect of improving the brightness of emergent light from the backlight module 100.

In addition, returning to FIG. 1, the backlight module 100 further includes at least one optical film 140 disposed on the quantum dot film 120. For example, in this embodiment, at least one optical film 140 may include a first prism sheet 141, a second prism sheet 142, and a diffuser 143 that are arranged in sequence above the quantum dot film 120. The first prism sheet 141 is disposed between the second prism sheet 142 and the light adjusting element 130, and the light adjusting element 130 is disposed between the first prism sheet 141 and the quantum dot film 120. The second prism sheet 142 is disposed between the diffuser 143 and the first prism sheet 141, and the diffuser 143 is disposed between the display panel 200 and the second prism sheet 142. The first prism sheet 141 has multiple first prism columns 141a extending in the third direction d3, and the second prism sheet 142 has multiple second prism columns 142a extending in the fourth direction d4, and the third direction d3 is intersected with the fourth direction d4.

FIG. 3A is a three-dimensional schematic view of a cone according to the first embodiment of the disclosure. FIG. 3B is a schematic front view of a cone according to the first embodiment of the disclosure. FIG. 3C is a schematic side view of a cone according to the first embodiment of the disclosure. FIG. 3D is a schematic bottom view of a cone according to the first embodiment of the disclosure.

Please refer to FIG. 1 and FIG. 3A to FIG. 3D. In this embodiment, each cone 131 has a bottom surface 131a, multiple side surfaces 131c, and a vertex 131p. The bottom surface 131a and the vertex 131p are arranged opposite to each other. The vertex 131p is closer to the quantum dot film 120. The bottom surface 131a is farther away from the quantum dot film 120. The multiple side surfaces 131c are disposed between the bottom surface 131a and the vertex 131p. Both sides 131e of each side surface 131c connected to the vertex 131p have an angle θ, and a range of the angle θ from 5° to 175°. Preferably, a range of the angle θ from 60° to 100°, but this disclosure is not limited thereto.

In this embodiment, the multiple side surfaces 131c of each cone 131 include a first side surface 131c-1 and a second side surface 131c-2 adjacent to each other. Both sides 131e of the first side surface 131c-1 connected to the vertex 131p form a first angle θ1, and both sides 131e of the second side surface 131c-2 connected to the vertex 131p form a second angle θ2. In the embodiment, the first angle θ1 and the second angle θ2 can be optionally the same, but the disclosure is not limited thereto.

In addition, in this embodiment, the bottom surface 131a of each cone 131 may be optionally polygonal. That is to say, in this embodiment, each cone 131 can optionally be a polygonal pyramid. For example, in this embodiment, the bottom surface 131a of each cone 131 may be a square, and each cone 131 may be a square cone. However, this disclosure is not limited thereto. In other embodiments, the cone 131 may also have other shapes, which will be described in the following paragraphs with reference to other drawings.

In addition, each cone 131 has a height H in the positive direction n (marked in FIG. 1). In this embodiment, the multiple heights H of the multiple cones 131 can be substantially equal. However, the disclosure is not limited thereto. In other embodiments, the multiple heights H of the multiple cones 131 may not be equal.

Figure 4:
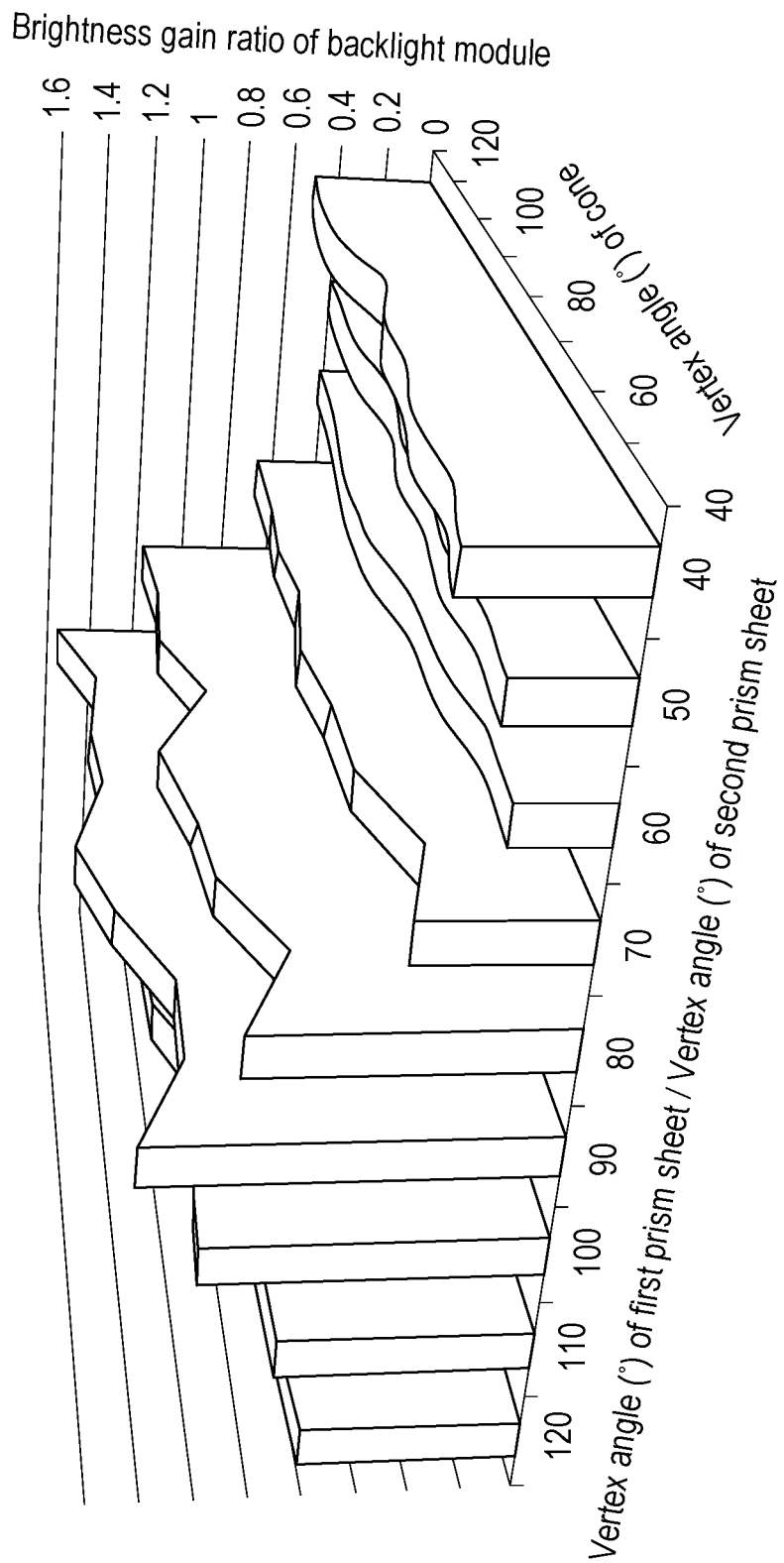
FIG. 4 shows the relationship between the vertex angle of the cone, the vertex angle of the first prism sheet, the vertex angle of the second prism sheet and the brightness gain ratio of the emergent light of the backlight module according to the first embodiment of the disclosure.

FIG. 4 shows the relationship between the vertex angle of the cone, the vertex angle of the first prism sheet, the vertex angle of the second prism sheet and the brightness gain ratio of the backlight module according to an embodiment of the disclosure. Please refer to FIG. 1, FIG. 3B and FIG. 4, the vertex angle of the cone 131 referred to in FIG. 4 is the angle θ (marked in FIG. 3B). The vertex angle of the first prism sheet 141 referred to in FIG. 4 is the angle α (marked in FIG. 1) between the two adjacent side surfaces 141 as of the first prism column 141a. The vertex angle of the second prism sheet 142 referred to in FIG. 4 is the angle β (marked in FIG. 1) between the two adjacent side surfaces 142 as of the second prism column 142a. The brightness gain ratio of the backlight module 100 referred to in FIG. 4 is the ratio of the brightness of emergent light from the backlight module 100 of the embodiment of FIG. 1 and the brightness of emergent light from the backlight module of the comparative example not shown. The only difference between the backlight module in the comparative example and the backlight module 100 of FIG. 1 is that the backlight module of the comparative example replaces the light adjusting element 130 of the backlight module 100 of FIG. 1 with a diffuser.

Please refer to FIG. 1, FIG. 3B and FIG. 4. It can be obtained from the data in FIG. 4 that in this embodiment, preferably, a range of the angle of the vertex angle (the angle α) of the first prism sheet 141 and a range of the angle of the vertex angle (the angle β) of the second prism sheet 142 from 80° to 110°, and a range of the angle of the vertex angle (the angle θ) of the cone 131 of the light adjusting element 130 from 60° to 100°. In this way, the brightness gain ratio of the backlight module 100 is greater than 1. For example, in this embodiment, it is most preferable to set the angle of the vertex angle (the angle α) of the first prism sheet 141 and the angle of the vertex angle (the angle β) of the second prism sheet 142 to be 90°, and set the angle of the vertex angle (the angle θ) of the cone 131 of the light adjusting element 130 to be 80°, so that the brightness gain ratio of the backlight module 100 has the maximum value, but the disclosure is not limited thereto.

It must be noted here that the following embodiments use the element numbers and part of the content of the foregoing embodiments, wherein the same numbers are used to represent the same or similar elements, and the description of the same technical content is omitted. For the description of the omitted parts, reference may be made to the foregoing embodiments, and no repetition is incorporated in the following embodiments.

Figure 5:
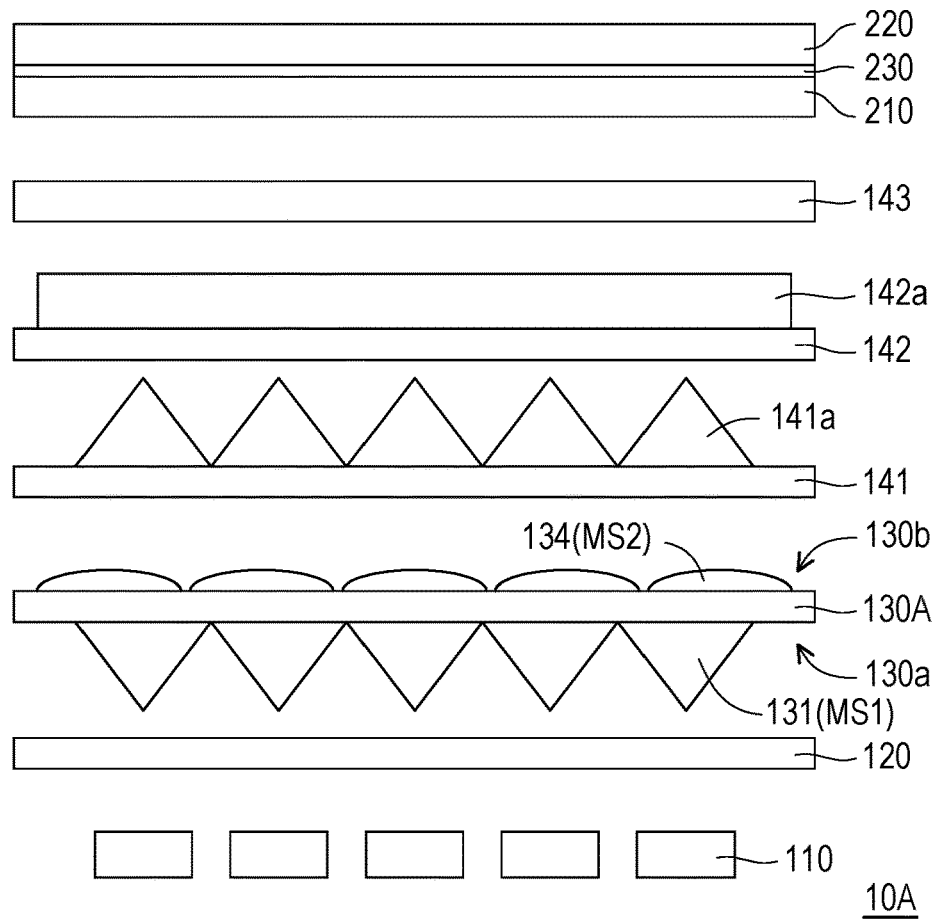
FIG. 5 is a schematic cross-sectional view of a display apparatus according to the second embodiment of the disclosure.
Figure 6:
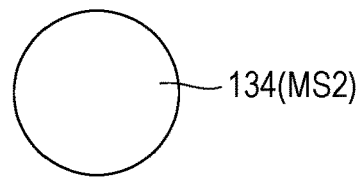
FIG. 6 is a schematic top view of a second optical microstructure of a light adjusting element according to the second embodiment of the disclosure.

FIG. 5 is a schematic cross-sectional view of a display apparatus according to the second embodiment of the disclosure. FIG. 6 is a schematic top view of a second optical microstructure of a light adjusting element according to the second embodiment of the disclosure.

The display apparatus 10A and its backlight module 100A in FIG. 5 are similar to the display apparatus 10 and its backlight module 100 in FIG. 1. The difference between the two is that the light adjusting element 130A in FIG. 5 is different from the light adjusting element 130 in FIG. 1.

Please refer to FIG. 5 and FIG. 6. Specifically, in this embodiment, the second surface 130b of the light adjusting element 130A has multiple second optical microstructures MS2, and the shape of each of the multiple first optical microstructures MS1 is different from the shape of each of the multiple second optical microstructures MS2. With the second optical microstructure MS2 of the light adjusting element 130A, it is possible to prevent the light adjusting element 130A from being attracted to the at least one optical film 140 above it. In addition, the second optical microstructure MS2 can also avoid interference between the light adjusting element 130A and the at least one optical film 140.

For example, in this embodiment, the multiple second optical microstructures MS2 include multiple convex lenses 134 protruding toward the at least one optical film 140. In this embodiment, the multiple vertical projections of the multiple convex lenses 134 on the quantum dot film 120 can optionally be multiple circles, but the disclosure is not limited thereto.

Figure 7:
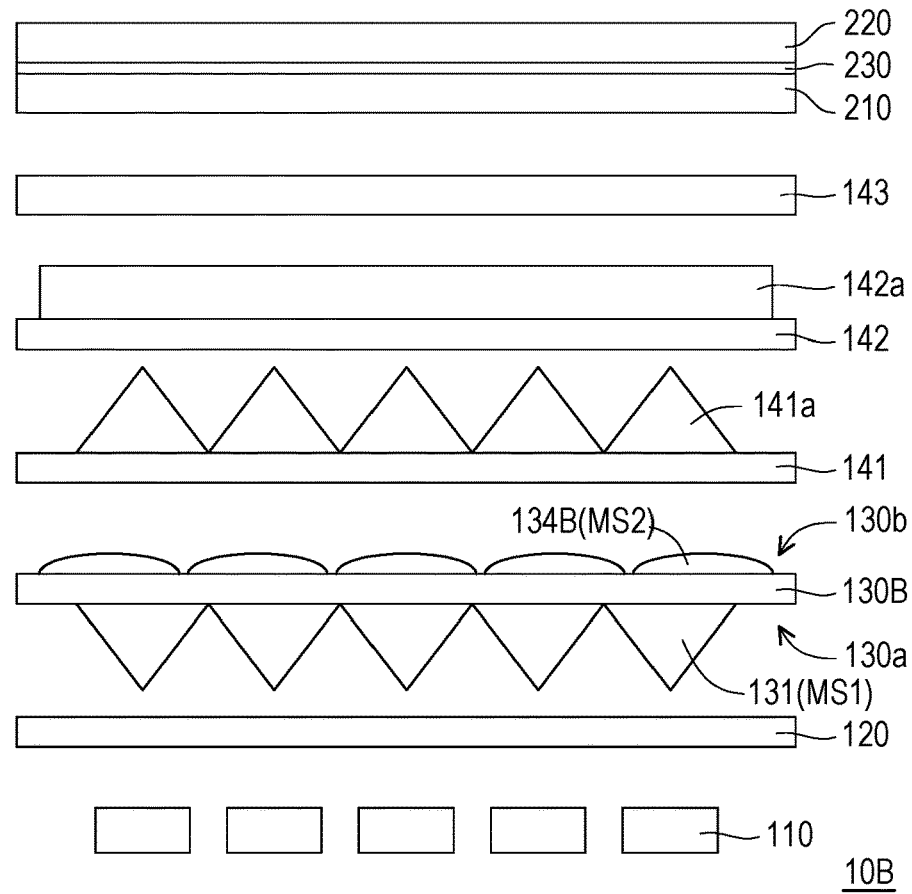
FIG. 7 is a schematic cross-sectional view of a display apparatus according to the third embodiment of the disclosure.
Figure 8:
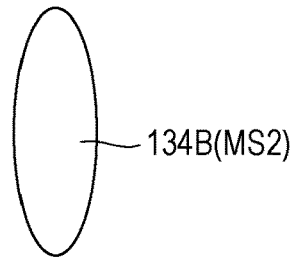
FIG. 8 is a schematic top view of a second optical microstructure of a light adjusting element according to the third embodiment of the disclosure.

FIG. 7 is a schematic cross-sectional view of a display apparatus according to the third embodiment of the disclosure. FIG. 8 is a schematic top view of a second optical microstructure of a light adjusting element according to the third embodiment of the disclosure.

The display apparatus 10B and its backlight module 100B in FIG. 7 are similar to the display apparatus 10A and its backlight module 100A in FIG. 5. The difference between the two is the multiple convex lenses 134B included in the multiple second optical microstructures MS2 of the light adjusting element 130B in FIG. 7 are different from the multiple convex lenses 134 included in the multiple second optical microstructures MS2 of the light adjusting element 130A in FIG. 5. Please refer to FIG. 7 and FIG. 8. Specifically, in this embodiment, the multiple convex lenses 134B protrude toward the at least one optical film 140, and the multiple vertical projections of the multiple convex lenses 134B on the quantum dot film 120 can be optionally multiple ovals, but this disclosure is not limited thereto.

Figure 9:
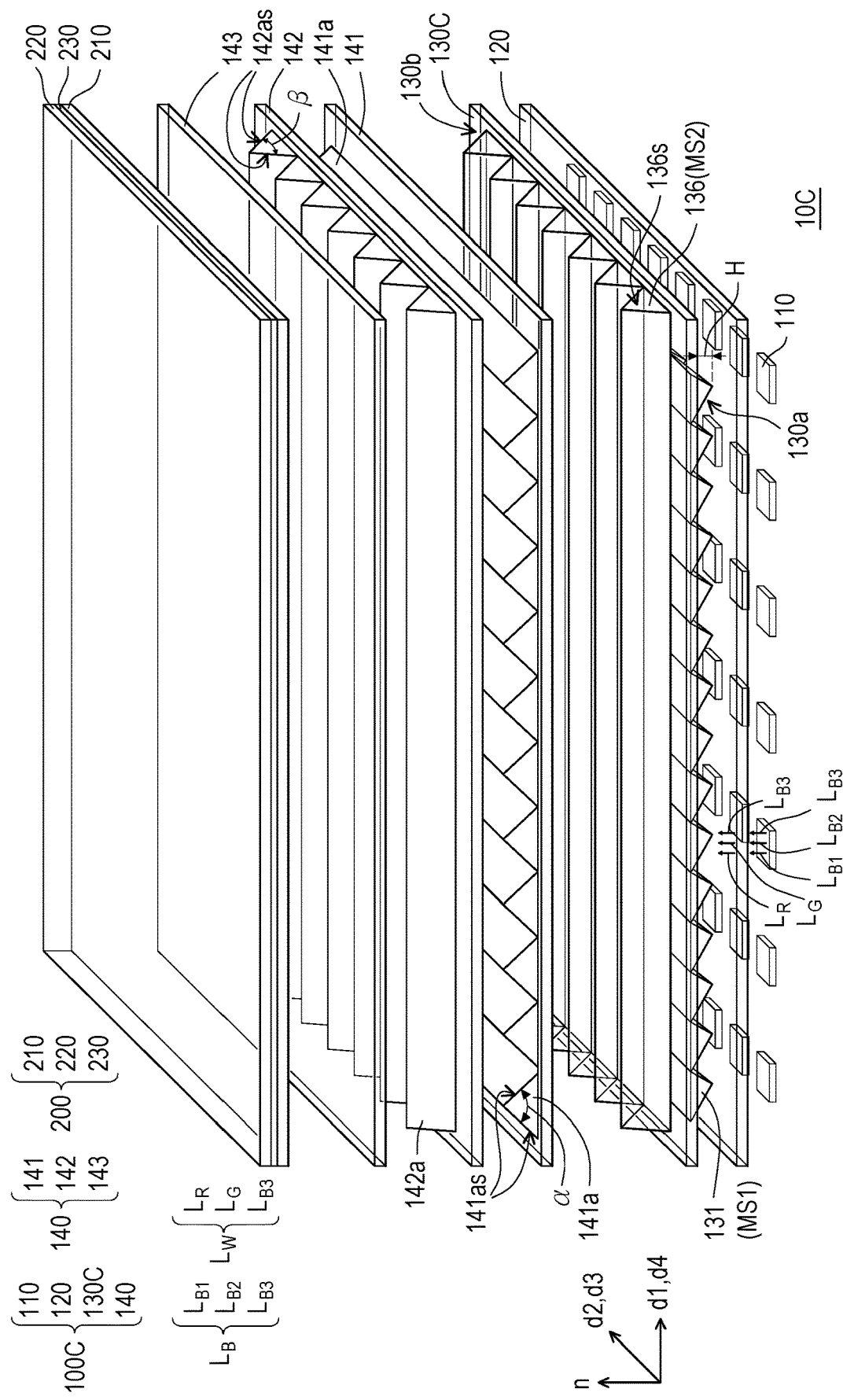
FIG. 9 is a three-dimensional schematic view of a display apparatus according to the fourth embodiment of the disclosure.

FIG. 9 is a three-dimensional schematic view of a display apparatus according to the fourth embodiment of the disclosure. The display apparatus 10C and its backlight module 100C in FIG. 9 are similar to the display apparatus 10A and its backlight module 100A in FIG. 5. The difference between the two is the light adjusting element 130C in FIG. 9 is different from the light adjusting element 130A in FIG. 5.

Please refer to FIG. 9, specifically, in this embodiment, the multiple second optical microstructures MS2 of the light adjusting element 130C include multiple columns 136 extending in the first direction d1. In this embodiment, the extending direction (i.e., the first direction d1) of the columns 136 of the light adjusting element 130C is intersected with the extending direction (i.e., the third direction d3) of the first prism columns 141a of the first prism sheet 141 to avoid interference between the light adjusting element 130C and the at least one optical film 140. In this embodiment, the extending direction (i.e., the first direction d1) of the columns 136 and the extending direction (i.e., the fourth direction d4) of the second prism column 142a of the second prism sheet 142 may be the same or may be intersected with each other, the disclosure provides no limitation thereto.

Please refer to FIG. 9, in this embodiment, the cross section 136s of each column 136 perpendicular to the first direction d1 can be optionally a triangle. That is to say, in this embodiment, the column 136 of the light adjusting element 130C can be a triangular column, but the disclosure is not limited thereto.

Figure 10:
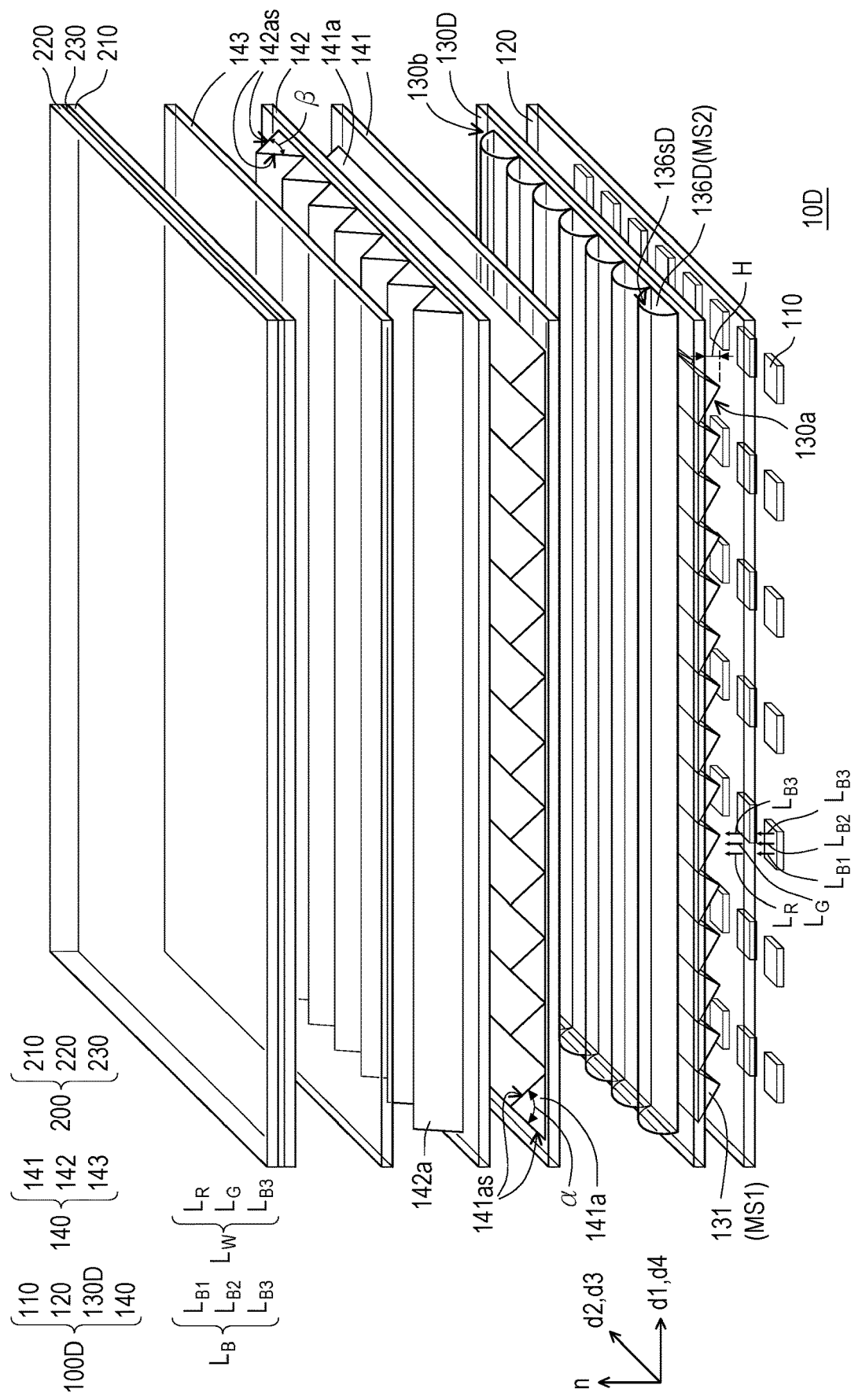
FIG. 10 is a three-dimensional schematic view of a display apparatus according to the fifth embodiment of the disclosure.

FIG. 10 is a three-dimensional schematic view of a display apparatus according to the fifth embodiment of the disclosure. The display apparatus 10D and its backlight module 100D of FIG. 10 are similar to the display apparatus 10C and its backlight module 100C of FIG. 9, and the difference between the two is that the column 136D of the light adjusting element 130D of FIG. 10 is different from the column 136 of the light adjusting element 130C of FIG. 9.

Please refer to FIG. 10, specifically, in this embodiment, the cross section 136sD of each column 136D perpendicular to the first direction d1 may be a part of a circle (for example: a major segment, a minor segment or half round). That is to say, in this embodiment, the column 136D of the light adjusting element 130D may be a major segment column, a minor segment column or a half round column, but the disclosure is not limited thereto.

Figure 11:
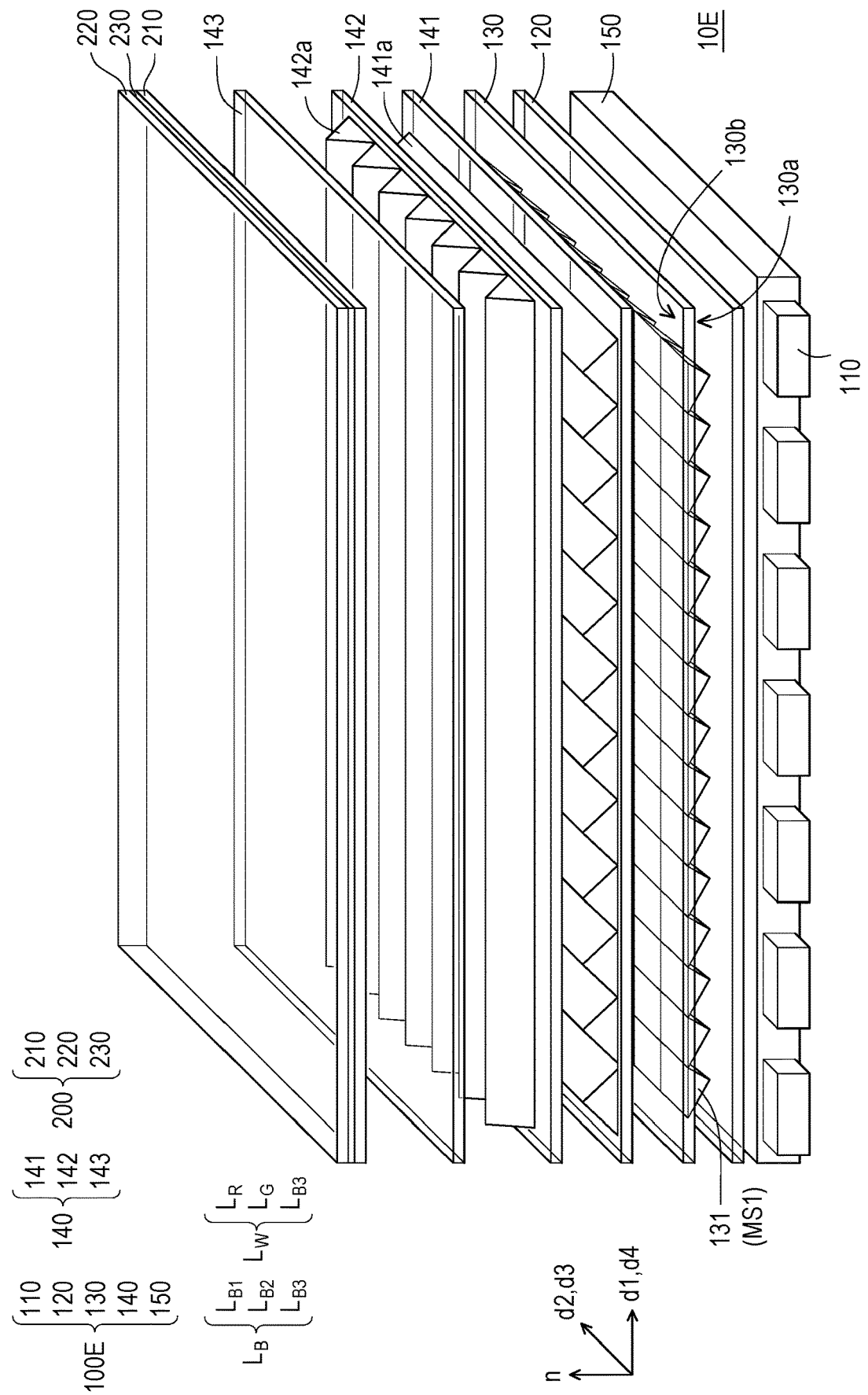
FIG. 11 is a three-dimensional schematic view of a display apparatus according to the sixth embodiment of the disclosure.

FIG. 11 is a three-dimensional schematic view of a display apparatus according to the sixth embodiment of the disclosure. The display apparatus 10E and its backlight module 100E of FIG. 11 are similar to the display apparatus 10 and its backlight module 100 of FIG. 1, and the differences between the two will be described below. In the embodiment of FIG. 1, the quantum dot film 120 is disposed between the light-emitting element 110 and the light adjusting element 130. That is to say, the backlight module 100 of FIG. 1 is a direct type backlight module. In the embodiment of FIG. 11, the backlight module 100E further includes a light guide element 150, and the quantum dot film 120 is disposed between the light guide element 150 and the light adjusting element 130, and the light-emitting element 110 is disposed on at least one side of the light guide element 150. That is to say, the backlight module 100E of FIG. 11 is a side light backlight module.

Figure 12A:
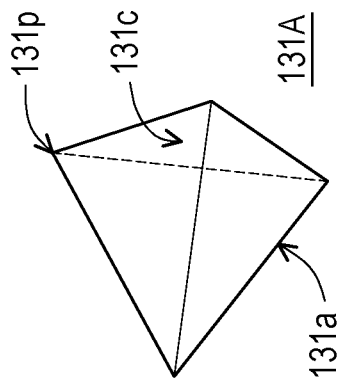
FIG. 12A is a three-dimensional schematic view of a cone according to the seventh embodiment of the disclosure.
Figure 12D:
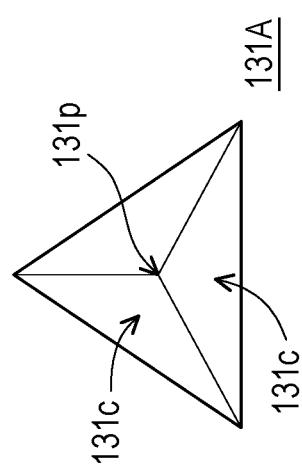
FIG. 12D is a schematic bottom view of a cone according to the seventh embodiment of the disclosure.
Figure 12B:
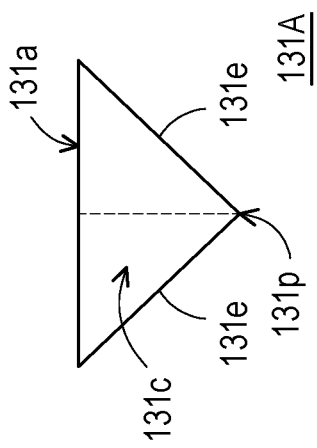
FIG. 12B is a schematic front view of a cone according to the seventh embodiment of the disclosure.
Figure 12C:
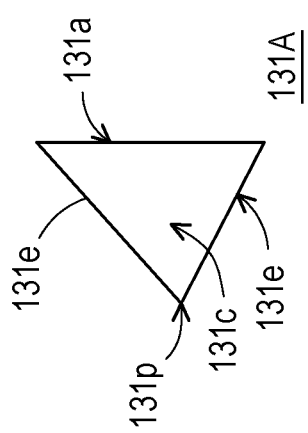
FIG. 12C is a schematic side view of a cone according to the seventh embodiment of the disclosure.

FIG. 12A is a three-dimensional schematic view of a cone according to the seventh embodiment of the disclosure. FIG. 12B is a schematic front view of a cone according to the seventh embodiment of the disclosure. FIG. 12C is a schematic side view of a cone according to the seventh embodiment of the disclosure. FIG. 12D is a schematic bottom view of a cone according to the seventh embodiment of the disclosure.

Referring to FIG. 12A to FIG. 12D, in this embodiment, the bottom surface 131a of the cone 131A can optionally be a triangle. That is to say, in this embodiment, the cone 131A may optionally be a triangular pyramid. The cone 131A can be used to replace the cone 131 of the backlight module 100, 100A, 100B, 100C, 100D or 100E of the previous embodiment, and the backlight module formed in this way and the display apparatus including such backlight module also fall within the scope to be protected by the disclosure.

Figure 13A:
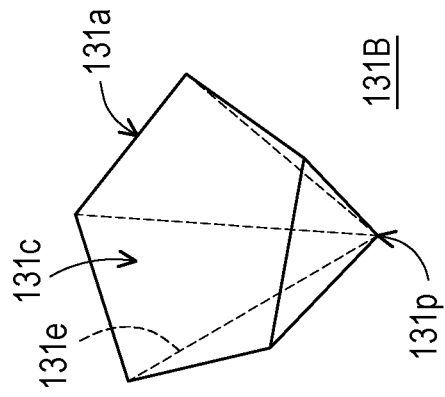
FIG. 13A is a three-dimensional schematic view of a cone according to the eighth embodiment of the disclosure.
Figure 13B:
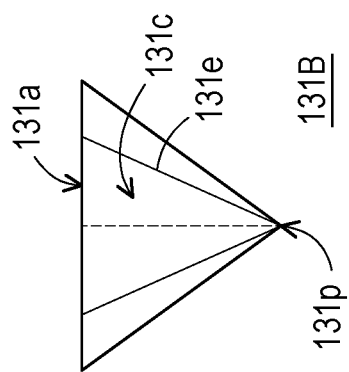
FIG. 13B is a schematic front view of a cone according to the eighth embodiment of the disclosure.
Figure 13C:
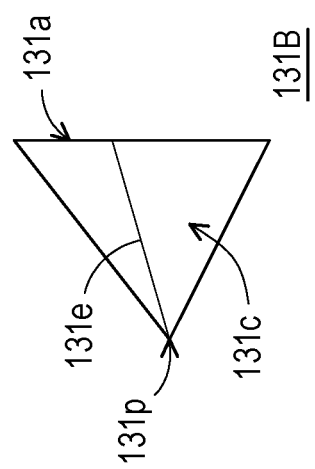
FIG. 13C is a schematic side view of a cone according to the eighth embodiment of the disclosure.
Figure 13D:
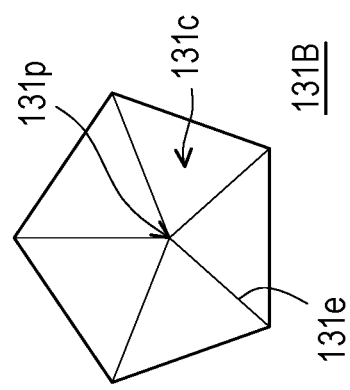
FIG. 13D is a schematic bottom view of a cone according to the eighth embodiment of the disclosure.

FIG. 13A is a three-dimensional schematic view of a cone according to the eighth embodiment of the disclosure. FIG. 13B is a schematic front view of a cone according to the eighth embodiment of the disclosure. FIG. 13C is a schematic side view of a cone according to the eighth embodiment of the disclosure. FIG. 13D is a schematic bottom view of a cone according to the eighth embodiment of the disclosure.

Please refer to FIG. 13A to FIG. 13D, in this embodiment, the bottom surface 131a of the cone 131B can be optionally a pentagon. That is to say, in this embodiment, the cone 131B may optionally be a pentagonal pyramid. The cone 131B can be used to replace the cone 131 of the backlight module 100, 100A, 100B, 100C, 100D or 100E of the foregoing embodiments, and the backlight module formed in this way and the display apparatus including such backlight module also fall within the scope to be protected by the disclosure.

Figure 14A:
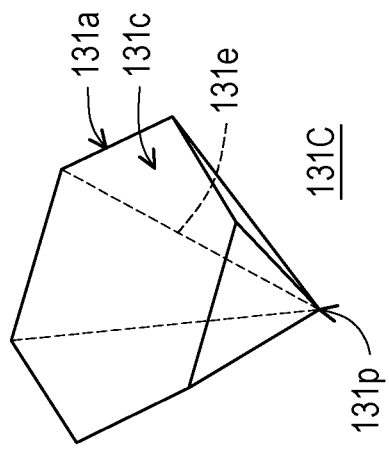
FIG. 14A is a three-dimensional schematic view of a cone according to the ninth embodiment of the disclosure.
Figure 14D:
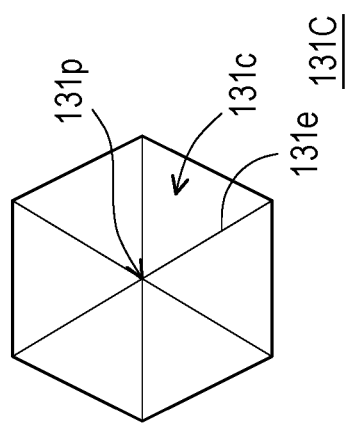
FIG. 14D is a schematic bottom view of a cone according to the ninth embodiment of the disclosure.
Figure 14B:
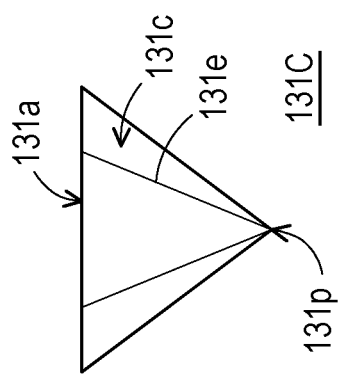
FIG. 14B is a schematic front view of a cone according to the ninth embodiment of the disclosure.
Figure 14C:
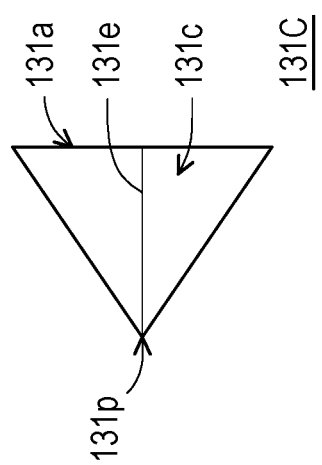
FIG. 14C is a schematic side view of a cone according to the ninth embodiment of the disclosure.

FIG. 14A is a three-dimensional schematic view of a cone according to the ninth embodiment of the disclosure. FIG. 14B is a schematic front view of a cone according to the ninth embodiment of the disclosure. FIG. 14C is a schematic side view of a cone according to the ninth embodiment of the disclosure. FIG. 14D is a schematic bottom view of a cone according to the ninth embodiment of the disclosure.

Please refer to FIG. 14A to FIG. 14D, in this embodiment, the bottom surface 131a of the cone 131C may optionally be a hexagon. That is, in the present embodiment, the cone 131C may optionally be a hexagonal pyramid. The cone 131C can be used to replace the cone 131 of the backlight module 100, 100A, 100B, 100C, 100D or 100E of the foregoing embodiments, and the backlight module formed in this way and the display apparatus including such backlight module also fall within the scope to be protected by the disclosure.

Figure 15A:
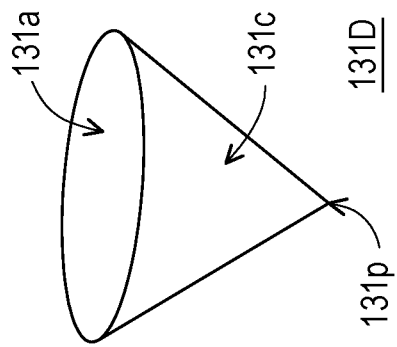
FIG. 15A is a three-dimensional schematic view of a cone according to the tenth embodiment of the disclosure.
Figure 15C:
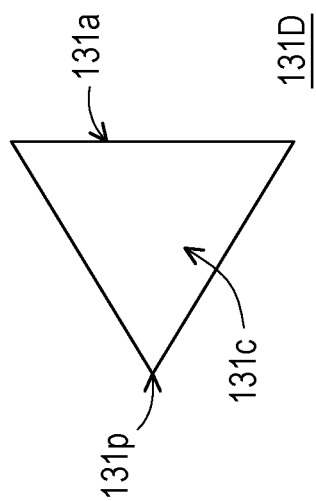
FIG. 15C is a schematic side view of a cone according to the tenth embodiment of the disclosure.
Figure 15D:
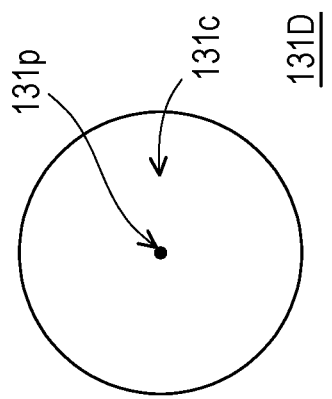
FIG. 15D is a schematic bottom view of a cone according to the tenth embodiment of the disclosure.
Figure 15B:
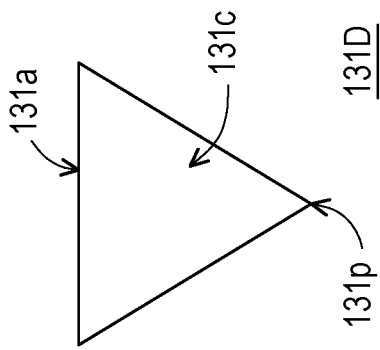
FIG. 15B is a schematic front view of a cone according to the tenth embodiment of the disclosure.

FIG. 15A is a three-dimensional schematic view of a cone according to the tenth embodiment of the disclosure. FIG. 15B is a schematic front view of a cone according to the tenth embodiment of the disclosure. FIG. 15C is a schematic side view of a cone according to the tenth embodiment of the disclosure. FIG. 15D is a schematic bottom view of a cone according to the tenth embodiment of the disclosure.

Please refer to FIG. 15A to FIG. 15D, in this embodiment, the bottom surface 131a of the cone 131D can optionally be circular, and the side surface 131c of the cone 131D is a curved surface. That is, in the embodiment, the cone 131D may optionally be a circular cone. The cone 131D can be used to replace the cone 131 of the backlight module 100, 100A, 100B, 100C, 100D or 100E of the foregoing embodiments. The backlight module formed in this way and the display apparatus including such backlight module also fall within the scope to be protected by the disclosure.

FIG. 16A is a schematic bottom view of a cone according to the eleventh embodiment of the disclosure. FIG. 16B is a schematic front view of a cone according to the eleventh embodiment of the disclosure. FIG. 16C is a schematic side view of a cone according to the eleventh embodiment of the disclosure.

Please refer to FIG. 16A to 16C. In this embodiment, the cone 131E has a bottom surface 131a, multiple side surfaces 131c and a vertex 131p. The bottom surface 131a and the vertex 131p are disposed opposite to each other, and the multiple side surfaces 131c are disposed between the bottom surface 131a and the vertex 131p. The multiple side surfaces 131c include a first side surface 131c-1 and a second side surface 131c-2 adjacent to each other. Both sides 131e of the first side surface 131c-1 connected to the vertex 131p form a first angle θ1, and both sides 131e of the second side surface 131c-2 connected to the vertex 131p form a second angle θ2, and the first angle θ1 and the second angle θ2 are different. The cone 131E can be used to replace the cone 131 of the backlight module 100, 100A, 100B, 100C, 100D or 100E of the foregoing embodiments. The backlight module formed in this way and the display apparatus including such backlight module also fall within the scope to be protected by the disclosure.

Figure 17A:
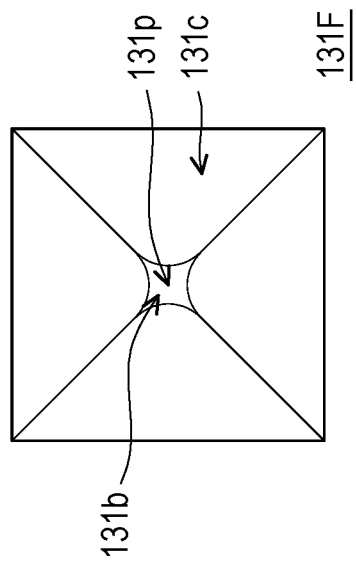
FIG. 17A is a schematic bottom view of a cone according to the twelfth embodiment of the disclosure.
Figure 17B:
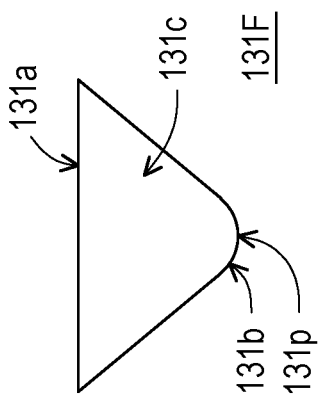
FIG. 17B is a schematic front view of a cone according to the twelfth embodiment of the disclosure.
Figure 17C:
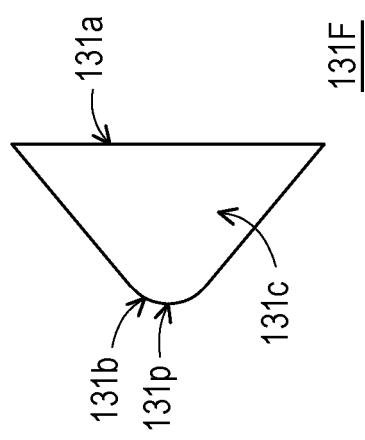
FIG. 17C is a schematic side view of a cone according to the twelfth embodiment of the disclosure.

FIG. 17A is a schematic bottom view of a cone according to the twelfth embodiment of the disclosure. FIG. 17B is a schematic front view of a cone according to the twelfth embodiment of the disclosure. FIG. 17C is a schematic side view of a cone according to the twelfth embodiment of the disclosure.

Please refer to FIG. 17A to FIG. 17C, in this embodiment, the cone 131F includes a pyramid-like cone, the pyramid-like cone has a bottom surface 131a, a top surface 131b and multiple side surfaces 131c. The bottom surface 131a and the top surface 131b are disposed opposite to each other. The vertex 131p of each pyramid-like cone is located on the top surface 131b, and the multiple side surfaces 131c are disposed between the bottom surface 131a and the top surface 131b. In this embodiment, the top surface 131b of the pyramid-like cone is a convex surface, but the disclosure is not limited thereto. The cone 131F can be used to replace the cone 131 of the backlight module 100, 100A, 100B, 100C, 100D or 100E of the foregoing embodiments, and the backlight module formed in this way and the display apparatus including such backlight module also fall within the scope to be protected by the disclosure.

Figure 18A:
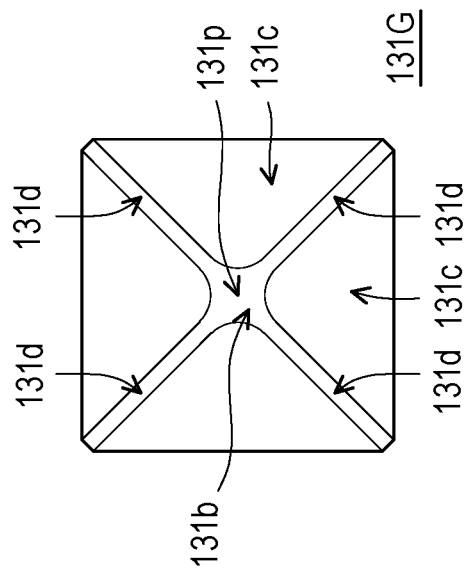
FIG. 18A is a schematic bottom view of a cone according to the thirteenth embodiment of the disclosure.
Figure 18B:
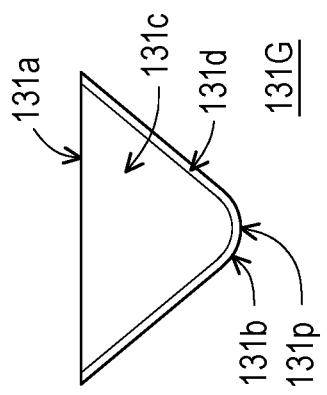
FIG. 18B is a schematic front view of a cone according to the thirteenth embodiment of the disclosure.
Figure 18C:
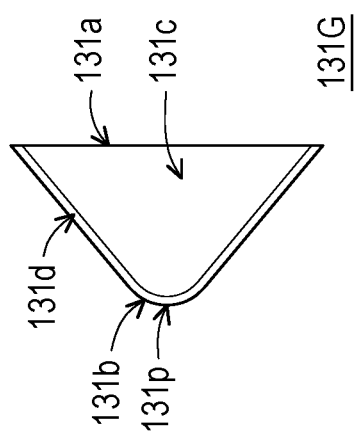
FIG. 18C is a schematic side view of a cone according to the thirteenth embodiment of the disclosure.

FIG. 18A is a schematic bottom view of a cone according to the thirteenth embodiment of the disclosure. FIG. 18B is a schematic front view of a cone according to the thirteenth embodiment of the disclosure. FIG. 18C is a schematic side view of a cone according to the thirteenth embodiment of the disclosure.

Please refer to FIG. 18A to FIG. 18C, in this embodiment, the cone 131G includes multiple pyramid-like cones. The pyramid-like cones of FIG. 18A to FIG. 18C are similar to the pyramid-like cones of FIG. 17A to FIG. 17C. The difference between the two is that in the embodiments of FIG. 18A to FIG. 18C, the pyramid-like cone further has multiple junction surfaces 131d, and each junction surface 131d is disposed between the multiple side surfaces 131c and between the bottom surface 131a and the top surface 131b. In this embodiment, the junction surface 131d of the pyramid-like cone is a convex surface, but the disclosure is not limited thereto. The cone 131G can be used to replace the cone 131 of the backlight module 100, 100A, 100B, 100C, 100D or 100E of the foregoing embodiments, and the backlight module formed in this way and the display apparatus including such backlight module also fall within the scope to be protected by the disclosure.

FIG. 19A is a schematic bottom view of a cone according to the fourteenth embodiment of the disclosure. FIG. 19B is a schematic front view of a cone according to the fourteenth embodiment of the disclosure. FIG. 19C is a schematic side view of a cone according to the fourteenth embodiment of the disclosure.

Please refer to FIG. 19A to FIG. 19C, in this embodiment, the cone 131H includes multiple pyramid-like cones. The pyramid-like cones of FIG. 19A to FIG. 19C are similar to the pyramid-like cones of FIG. 18A to FIG. 18C. The difference between the two is in the embodiments of FIG. 19A to FIG. 19C, the top surface 131bH and the junction surface 131dH of the pyramid-like cone are flat surfaces, but the disclosure is not limited thereto. The cone 131H can be used to replace the cone 131 of the backlight module 100, 100A, 100B, 100C, 100D or 100E of the foregoing embodiments, and the backlight module formed in this way and the display apparatus including such backlight module also fall within the scope to be protected by the disclosure.

To sum up, a backlight module and a display apparatus according to an embodiment of the disclosure include a light-emitting element adaptable for emitting a blue light, a quantum dot film adaptable for converting the first portion and the second portion of the blue light into red light and green light, respectively, at least one optical film arranged on the quantum dot film, and a light adjusting element arranged between the at least one optical film and the quantum dot film. The light adjusting element has a first surface and a second surface facing the quantum dot film and the at least one optical film respectively. Specifically, the first surface of the light adjusting element has multiple first optical microstructures, and the multiple first optical microstructures include multiple cones protruding toward the quantum dot film. Through the refraction and reflection of the cone, part of the white light with a large divergence angle from the quantum dot film can be guided to the positive direction. In this way, the white light from the quantum dot film can be fully utilized to achieve the effect of enhancing the brightness of emergent light by the backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A backlight module, comprising:
a light-emitting element, adapted to emit a blue light;
a quantum dot film, disposed on a transmitting path of the blue light and adapted to convert a first portion and a second portion of the blue light into a red light and a green light respectively;
at least one optical film, disposed on the quantum dot film, wherein the at least one optical film comprises:

a first prism sheet, has a plurality of first prism columns, an angle range of a vertex angle of each of the plurality of first prism columns is from 80° to 110°, the vertex angle of each of the plurality of first prism columns is away from the first prism sheet; and a second prism sheet, has a plurality of second prism columns, an angle range of a vertex angle of each of the plurality of second prism columns is from 80° to 110°, the vertex angle of each of the plurality of second prism columns is away from the second prism sheet; and a light adjusting element, disposed between the at least one optical film and the quantum dot film, wherein the light adjusting element has a first surface and a second surface facing the quantum dot film and the at least one optical film, respectively, the first surface has a plurality of first optical microstructures, the plurality of first optical microstructures comprise a plurality of cones protruding toward the quantum dot film, the light adjusting element is disposed between the first prism sheet and the quantum dot film, the first prism sheet is disposed between the second prism sheet and the light adjusting element, each of the plurality of cones has a bottom surface, a plurality of side surfaces, and a vertex, the bottom surface and the vertex are disposed opposite to each other, the plurality of side surfaces are disposed between the bottom surface and the vertex, both sides of each of the plurality of side surfaces connected to the vertex form an angle, and a range of the angle is from 60° to 100°;

wherein the second surface of the light adjusting element has a plurality of second optical microstructures, the plurality of second optical microstructures comprise a plurality of columns, each of the plurality of columns is a lenticular or a prism, each of the plurality of columns extends in a first direction, the plurality of first prism columns of the first prism sheet extend in a third direction, and the first direction is intersected with the third direction.

2. The backlight module according to claim 1, wherein the bottom surface of each of the plurality of cones is a polygon.

3. The backlight module according to claim 1, wherein a bottom surface of each of the plurality of cones is rounded.

4. The backlight module according to claim 1, wherein the plurality of cones comprises a plurality of pyramid-like cones, each of the plurality of pyramid-like cones has a bottom surface, a top surface, and a plurality of side surfaces, and the bottom surface and the top surface are arranged opposite to each other, a vertex of each of the plurality of pyramid-like cones is located on the top surface, and the plurality of side surfaces are disposed between the bottom surface and the top surface.

5. The backlight module according to claim 4, wherein the top surface is a flat surface or a convex surface.

6. The backlight module according to claim 4, wherein each of the plurality of pyramid-like cones further has a plurality of junction surfaces, and each of the plurality of junction surfaces is disposed between the plurality of side surfaces and between the bottom surface and the top surface.

7. The backlight module according to claim 6, wherein the junction surface is a flat surface or a convex surface.

8. The backlight module according to claim 1, wherein each of the plurality of cones has a bottom surface, a plurality of side surfaces, and a vertex, the bottom surface and the vertex are disposed opposite to each other, the plurality of side surfaces are disposed between the bottom surface and the vertex, and each of the plurality of side surfaces comprise a first side surface and a second side surface, the first side surface and the second side surface are adjacent to each other, both sides of the first side surface connected to the vertex form a first angle, and both sides of the second side surface connected to the vertex form a second angle, and an angle of the first angle is different from an angle of the second angle.

9. The backlight module according to claim 1, wherein a shape of each of the plurality of first optical microstructures is different from a shape of each of the plurality of second optical microstructures.

10. The backlight module according to claim 9, wherein the plurality of second optical microstructures comprise a plurality of convex lenses protruding toward the at least one optical film.

11. The backlight module according to claim 10, wherein a plurality of vertical projections of the plurality of convex lenses on the quantum dot film are a plurality of circles.

12. The backlight module according to claim 10, wherein a plurality of vertical projections of the plurality of convex lenses on the quantum dot film are a plurality of ovals.

13. The backlight module according to claim 9, wherein the plurality of cones are arranged in an array in the first direction and a second direction, and the first direction is intersected with the second direction.

14. The backlight module according to claim 13, wherein a cross section of each of the plurality of columns perpendicular to the first direction is a triangle.

15. The backlight module according to claim 13, wherein a cross section of each of the plurality of columns perpendicular to the first direction is a part of a circle.

16. The backlight module according to claim 1, wherein the plurality of second prism columns extend in a fourth direction, the third direction is intersected with the fourth direction, and the at least one optical film further comprises:

a diffuser, wherein the second prism sheet is disposed between the diffuser and the first prism sheet.

17. A display apparatus, comprising:
a backlight module, comprising:
    a light-emitting element, adapted to emit a blue light;
    a quantum dot film, disposed on a transmitting path of the blue light and adapted to convert a first portion and a second portion of the blue light into a red light and a green light respectively;
    at least one optical film, disposed on the quantum dot film, wherein the at least one optical film comprises:
a first prism sheet, has a plurality of first prism columns, an angle range of a vertex angle of each of the plurality of first prism columns is from 80° to 110°, the vertex angle of each of the plurality of first prism columns is away from the first prism sheet; and
a second prism sheet, has a plurality of second prism columns, an angle range of a vertex angle of each of the plurality of second prism columns is from 80° to 110°, the vertex angle of each of the plurality of second prism columns is away from the second prism sheet; and
a light adjusting element, disposed between the at least one optical film and the quantum dot film, wherein the light adjusting element has a first surface and a second surface facing the quantum dot film and the at least one optical film, respectively, the first surface has a plurality of first optical microstructures, the plurality of first optical microstructures comprise a plurality of cones protruding toward the quantum dot film, the light adjusting element is disposed between the first prism sheet and the quantum dot film, the first prism sheet is disposed between the second prism sheet and the light adjusting element, each of the plurality of cones has a bottom surface, a plurality of side surfaces, and a vertex, the bottom surface and the vertex are disposed opposite to each other, the plurality of side surfaces are disposed between the bottom surface and the vertex, both sides of each of the plurality of side surfaces connected to the vertex form an angle, and a range of the angle is from 60° to 100°, wherein the second surface of the light adjusting element has a plurality of second optical microstructures, the plurality of second optical microstructures comprise a plurality of columns, each of the plurality of columns is a lenticular or a prism, each of the plurality of columns extends in a first direction, the plurality of first prism columns of the first prism sheet extend in a third direction, and the first direction is intersected with the third direction; and a display panel, arranged on the backlight module.

* * * * *